United States Patent [19]

Keeler

[11] Patent Number: 5,130,546
[45] Date of Patent: Jul. 14, 1992

[54] REDUCTION OF UNDESIRED HYPERFINE LINE ABSORPTION IN OPTICAL RESONANCE FILTERS

[75] Inventor: R. Norris Keeler, McLean, Va.

[73] Assignee: Kaman Aerospace Corporation, Bloomfield, Conn.

[21] Appl. No.: 599,158

[22] Filed: Oct. 17, 1990

[51] Int. Cl.$^5$ ................................................ G02B 5/20
[52] U.S. Cl. .................................. 250/458.1; 359/886
[58] Field of Search .................... 250/458.1; 350/312; 455/609

[56] References Cited

U.S. PATENT DOCUMENTS

| | | | |
|---|---|---|---|
| 4,292,526 | 9/1981 | Marling | 250/458.1 |
| 4,728,794 | 3/1988 | Allen | 250/339 |
| 4,829,597 | 5/1989 | Gelbwachs | 250/458.1 |

Primary Examiner—Jack I. Berman
Assistant Examiner—James E. Beyer
Attorney, Agent, or Firm—Fishman, Dionne & Cantor

[57] ABSTRACT

A spectral bandpass filter with a sharp angle independent absorption edge for reducing optical noise is used in conjunction with a known atomic resonance filter-detector or QLORD detector such as described in U.S. Pat. No. 4,292,526. The QLORD detector comprises two spectral bandpass filters enclosing or sandwiching a chamber containing atomic vapor. In accordance with the present invention, between the high-pass filter and the atomic vapor is placed a strip of volume absorbing filter material. The high pass filter has already admitted light which can be absorbed by the atomic vapor thereby excluding that incoming light which is in the spectral range of the light readmitted by radiative decay. The volume absorbing material then makes the further attenuative selection between the various sets of hyperfine lines. The line or lines which absorb the incoming signals are not attenuated; and the incoming light present as optical noise which could be absorbed by other hyperfine lines is strongly attenuated thereby minimizing that source of noise. In a preferred embodiment of the present invention, a volume filter is inserted to remove one of a set of two hyperfine lines, with optical transmission taking place through the other set of lines.

12 Claims, 4 Drawing Sheets

REDUCTION OF UNDESIRED HYPERFINE LINE ABSORPTION IN OPTICAL RESONANCE FILTERS

BACKGROUND OF THE INVENTION

This invention relates to the use of volume optical filters which have sharp absorption edges but shown no directional dependence of absorption or overall intensity. More particularly, this invention relates to a volume filter which is used to eliminate an undesirable set of hyperfine lines (and thereby increase the signal to noise ratio) in an isotropically sensitive atomic resonance filter-detector.

Ultra high-Q isotropically sensitive atomic resonance filter-detectors (also known as QLORD filters) such as described in U.S. Pat. No. 4,292,526, the entire contents of which is incorporated herein by reference, utilize atomic resonance transitions. These filter-detectors are bounded by two optical bandpass filters with a wide field of view. The filter-detector itself has a wide field of view ($2\pi$ steradian) and a very narrow acceptance bandwidth (Approx. 0.01Å). The outer and inner filter have no common transmission band, so that the incoming light is admitted and excites the atomic vapor. The vapor then emits at a different wavelength, passes through the second filter, and is detected. Absorption can take place in more than one set of hyperfine lines, so that extraneous optical noise from one set of lines can interfere with the signal received through the other.

Accordingly, there is a need to eliminate the undesirable set of hyperfine lines. Unfortunately, conventional blocking filters have edges that are not sharp. Therefore, they would be of little use in selectively attenuating closely spaced lines. On the other hand, notch filters or attenuators would be of little use even with their sharp absorption edges, because of the strong angle dependence of absorption. Light entering such systems could not be from a diffuse source, but only from a very narrow acceptance angle. This is the reason that Lyot or birefringent filters have proven impractical for such applications.

As mentioned, the presence of unwanted hyperfine lines admits extraneous optical noise into the system. Since the noise in the signal to noise ratio is the square root of the noise from a given source, the elimination of one of two sets of hyperfine lines of equal strength would reduce optical noise by some 35%.

SUMMARY OF THE INVENTION

The above-discussed and other problems and deficiencies of the prior art are overcome or alleviated by the present invention which provides a spectral bandpass filter with a sharp angle independent absorption edge for reducing the optical noise introduced through hyperfine lines not used for optical information transmission. The basic atomic resonance filter-detector or QLORD detector such as described in U.S. Pat. No. 4,292,526 comprises two spectral bandpass filters enclosing or sandwiching a chamber or plenum containing atomic vapor. In accordance with the present invention, between the high-pass filter and the atomic vapor is placed a strip of volume absorbing filter material. The high pass filter has already admitted light which can be absorbed by the atomic vapor, excluding that incoming light which is in the spectral range of the light readmitted by radiative decay. The volume absorbing material then makes the further attenuative selection between the various sets of hyperfine lines. The line or lines which absorb the incoming signals are not attenuated; and the incoming light present as optical noise which could be absorbed by other hyperfine lines is strongly attenuated thereby minimizing that source of noise.

In a preferred embodiment of the present invention, a volume filter is inserted to remove one of a set of two hyperfine lines, with optical transmission taking place through the other set of lines.

The present invention is particularly useful in satellite to airborne and airborne or satellite to undersea communications systems where it is desirable to minimize noise from solar radiation while at the same time permitting wide angle reception of laser light. The resultant improved efficiency of underwater communications to a submerged detector may then be used to increase the depth at which signals can be received.

The above-discussed and other features and advantages of the present invention will be appreciated and understood by those of ordinary skill in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
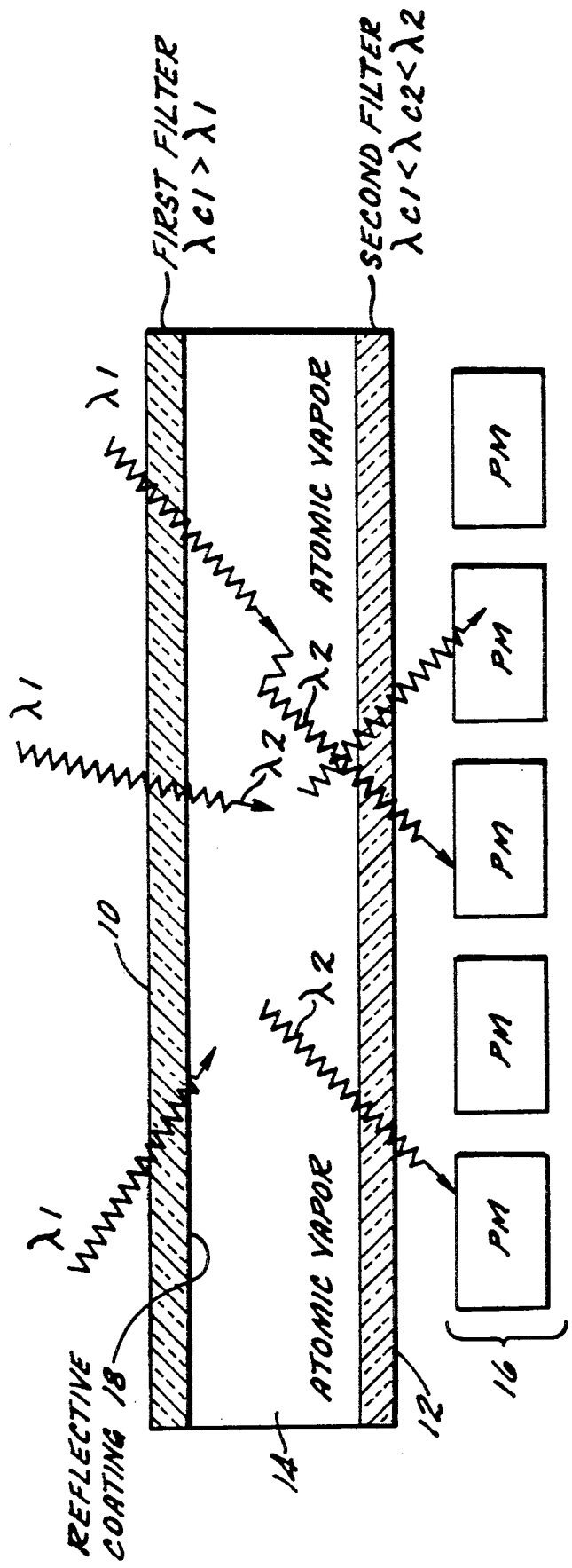
FIG. 1 is a schematic side elevation view of an atomic resonance filter-detector of the type described in U.S. Pat. No. 4,292,526.

Referring to FIG. 1, a passive filter-detector or QLORD filter of the type disclosed in U.S. Pat. No. 4,292,526 is shown. This detector comprises a first optical filter 10 spaced apart from a second optical filter 12, thereby forming a cavity 14 for containment of an atomic vapor. The atomic vapor is chosen so that incoming light to be filtered having a frequency $\lambda_1$ raises atoms in the atomic vapor from a ground state to a first excited state, the thus excited atoms fluorescing to the ground state at a wavelength $\lambda_2$ which is longer than that of $\lambda_1$. In this embodiment, the first optical filter 10 is chosen so that it has a cut-off wavelength $\lambda_{c1}$ greater than $\lambda_1$, thereby allowing light of the wavelength $\lambda_1$ to pass therethrough. The atomic vapor contained within the cavity 14 is raised to a first excited state by absorption of a photon at wavelength $\lambda_1$, and then fluoresces at a wavelength $\lambda_2$ which is longer than that of $\lambda_1$. The second optical filter 12 is chosen so that it has a cut-off wavelength $\lambda_{c2}$ less than the fluorescent wavelength $\lambda_2$ but greater than the cut-off wavelength of the first filter $\lambda_{c1}$. Thus, as one can appreciate, if the atomic vapor is chosen so that it will be raised to an appropriate energy level by photons from light having a wavelength to be detected, and from which fluorescence will take place $\lambda_2$ at a wavelength somewhat removed from $\lambda_1$, then a filter as above described will prevent any light entering through the first filter 10 from passing through the second filter 12, and only light generated within the cavity 14 at a wavelength $\lambda_2$ will be able to pass through the second filter 12. A bank of photomultipliers 16 are located directly below the second filter 12, the photomultipliers being chosen to be responsive to the fluorescence wavelength $\lambda_2$. A reflective coating 18 which transmits at wavelength $\lambda_1$, but reflects at wavelength $\lambda_2$ is provided on the side of the first optical filter 10 closest to the cavity 14 in order to prevent absorption of the various light components within the cavity 14.

Doppler broadening in the wavelength shifting of the atomic vapor determines the operating bandwidth of the detector, and is approximately 0.01Å per hyperfine line component at optical wavelengths. The atomic vapor contained between the two optical filters 10 and 12 is isotropically sensitive to incoming radiation, its effective solid angular sensitivity is limited only by the available fractional transparent surface area of the first filter 10. The time response of the detector is determined by the natural, as well as radiative trapping lifetime of the atomic levels employed in the wavelength shifting, these lifetimes typically being between 0.1 and 10 microseconds. Also as will be understood by those familiar with optical filters, absolute cut off frequencies are rarely obtained. Thus it is assumed that a filter is in a cut off region when more than 85% of incident light is blocked.

As discussed, a drawback of the detector of FIG. 1 is that absorption can take place in more than one set of hyperfine lines, so that extraneous optical noise (such as given off by sunlight) from one set of lines can interfere with the signal received through the other set of lines.

Figure 2:
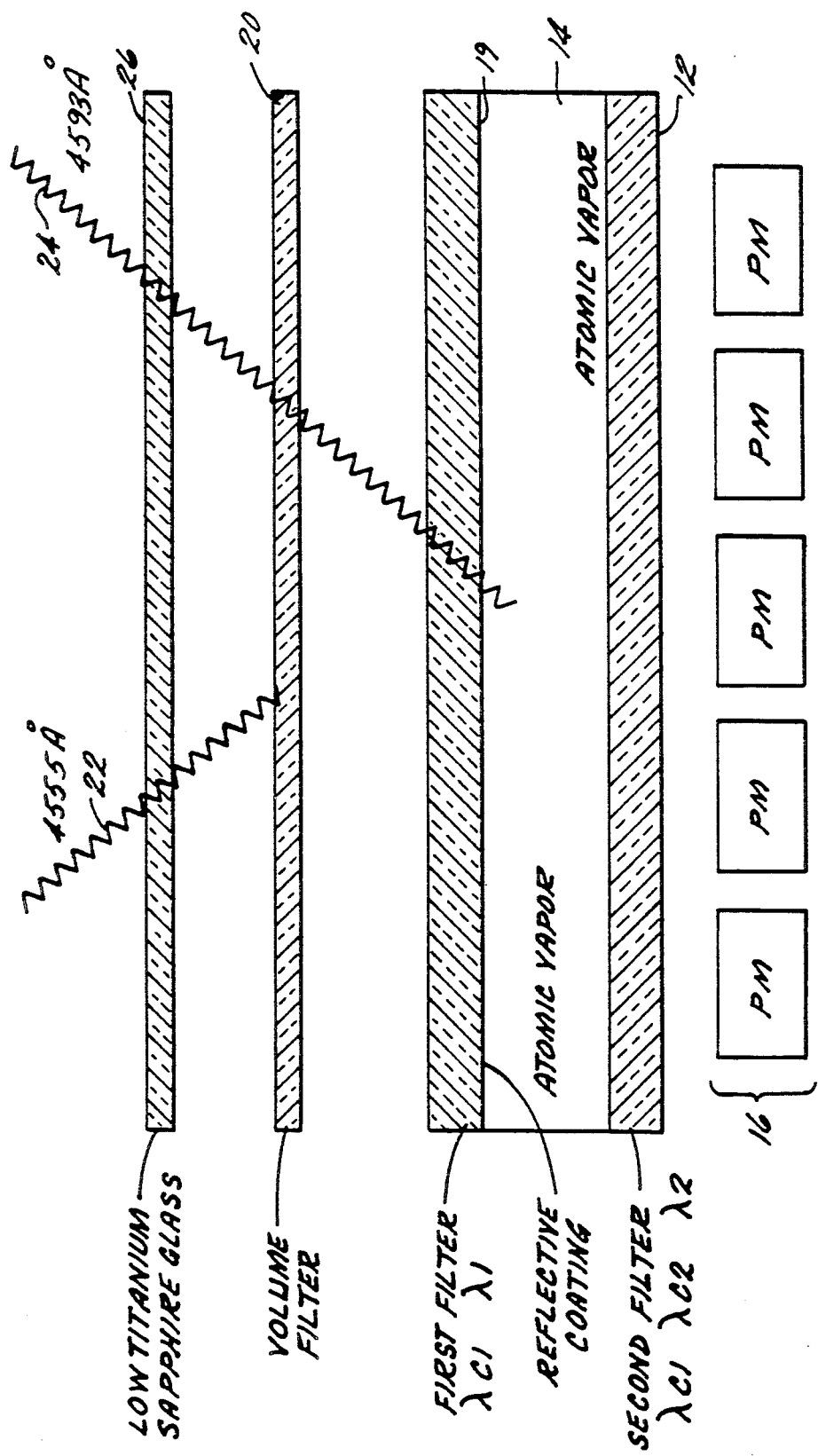
FIG. 2 is a schematic side elevation view of an improved atomic resonance filter-detector employing a volume filter in accordance with the present invention.

Referring now to FIG. 2, an improved QLORD detector is shown wherein an atomic resonance filter as described in FIG. 1 is shown in optical communication with a volume filter 20. As mentioned, first optical filter 10 receives the incoming optical signals and passes the short wavelength (e.g., 4555Å) signals 22 (visible) while excluding the longer (e.g., 4593Å) wavelengths 24 (near infrared). The passage of shorter wavelengths admits light which can enter both sets of hyperfine lines. The volume filter 20 (which is adjacent to one side of the cell) attenuates one set of hyperfine lines with respect to the other. This filter 20 is not angle sensitive. Light passes into the cell and is absorbed by the atomic vapor 14, but at only one set of hyperfine lines thereby raising the atomic species to an excited state. This species then fluoresces at a wavelength longer than that of the absorbed light. This light then passes through the filter 12 and is received by the detectors 16 and registers as a signal. Thus, volume filter 20 makes an additional attenuative selection between the various sets of hyperfine lines. The line or lines which absorb the incoming signal are not attenuated while the incoming light present as optical noise which could be absorbed by other hyperfine lines is strongly attenuated, thereby minimizing that source of noise.

Preferably, the incoming light passes through a titanium free (or low) sapphire window 26 to protect the filter receiver from the ambient pressure of the ocean at depths up to several hundred feet. The sapphire passes all optical wavelengths in the visible spectrum, and its freedom from the normally occurring titanium impurity prevents attenuation in the blue portion of the spectrum (which carries the signal) with the accompanying fluorescence in the near infrared.

Volume filters of the type described hereinabove are known and commercially available from Barnes Engineering, Inc. of Shelton, Conn. and sold under the tradename Barnes Laser Absorption Filter.

Figure 3:
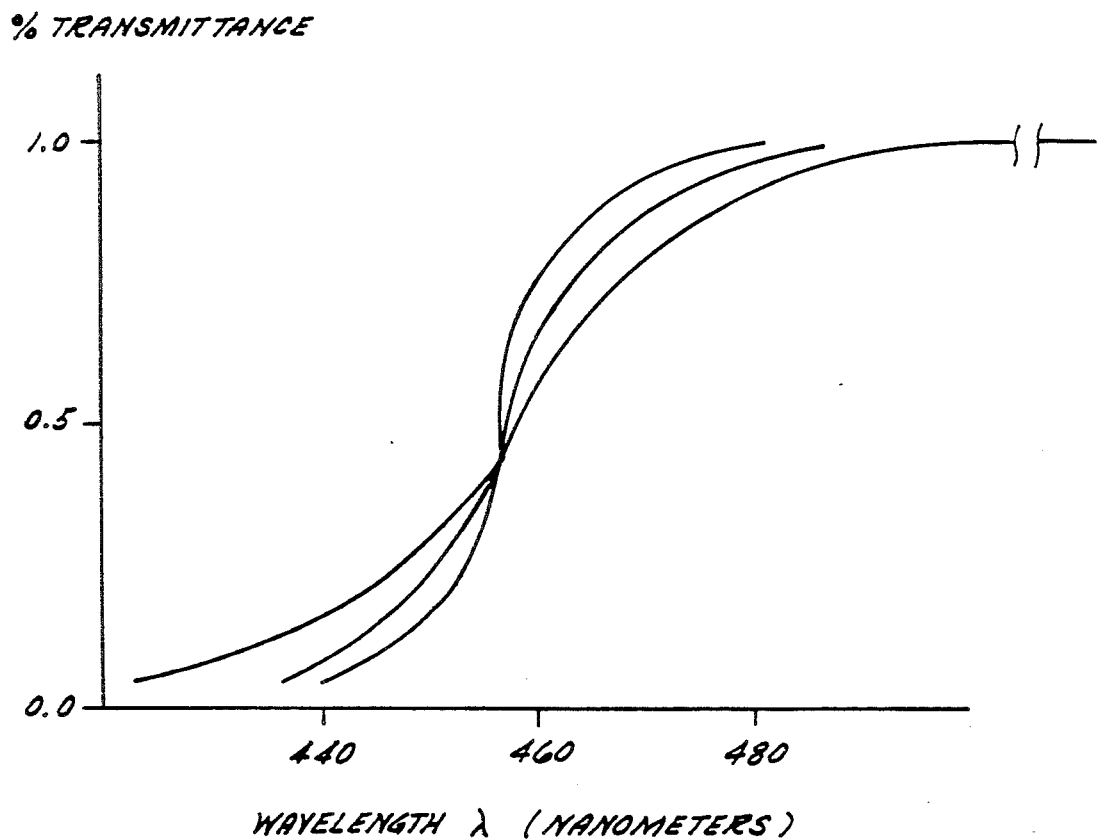
FIG. 3 is a graph showing the transmission characteristics of a volume filter as a function of wavelength.
Figure 4:
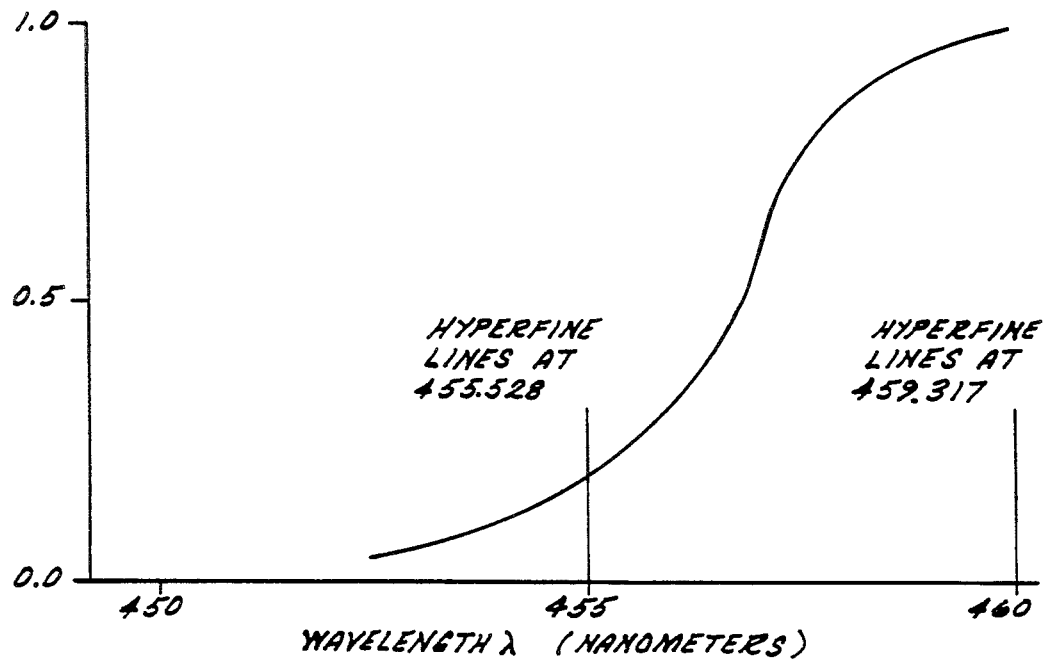
FIG. 4 is a graph showing the hyperfine lines in cesium vapor with the transmission characteristics of a volume filter superimposed.

FIG. 3 is a graph depicting the transmission characteristics of an idealized (symmetric) volume filter as a function of wavelength. For this particular volume filter, a symmetric cutoff edge is assumed. FIG. 4 is a graph depicting the hyperfine lines in cesium vapor with the transmission characteristics of a volume filter superimposed. Comparing FIG. 2 to FIG. 4, it can be seen that the hyperfine lines at a wavelength of approximately 4555 Ångstroms will be attenuated by the volume filter 20 while the hyperfine lines at a wavelength of approximately 4593 Ångstroms will pass through filter 20.

Figure 5:
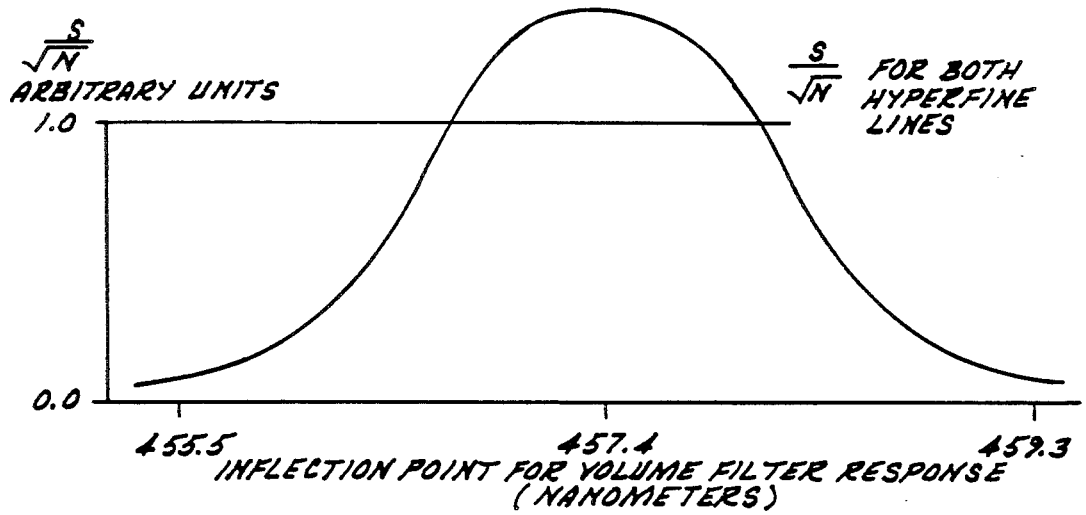
FIG. 5 is a graph showing the signal to noise ratio as a function of rejection or passage for a given volume filter.

In FIG. 5, the signal to noise ratio is plotted as a function of rejection or transmission for the volume filter of FIGS. 2 and 4.

One application for a detector whose performance is improved by the present invention as an underwater receiver of an airborne to underwater optical communications system, and the airborne to airborne receiver of a similar system. The airborne system could operate in the solar blind, while the undersea system would operate at the so-called Jerlov minimum, the wavelength for maximum transmission through the ocean. As mentioned, the previously described filter detector of FIG. 1 has been shown to operate efficiently in the ocean environment but solar noise is still a limiting factor. The combination of the volume filter and the known automatic QLORD filter detector overcomes this limiting factor. Using the volume filter, solar and other optical noise (such as bioluminescence) can be decreased significantly without narrowing the acceptance angle.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for detecting light at a first wavelength $\lambda_1$ comprising the steps of:
    providing an atomic vapor having atoms at a first energy level and capable of absorbing light at said first wavelength $\lambda_1$, and having absorbed said light at said first wavelength $\lambda_1$, fluorescing light at a second wavelength $\lambda_2$;
    providing a first optical filter chosen to transmit said first wavelength $\lambda_1$, and block said second wavelength $\lambda_2$, said first optical filter having a light incident side and a cavity side;
    providing a second optical filter spaced apart from said first optical filter and partially defining a cavity therewith for containment of said atomic vapor, wherein the cavity side of the first optical filter faces the second optical filter, said second optical filter being chosen to block said first wavelength $\lambda_1$ and transmit said second wavelength $\lambda_2$;
    subjecting said atomic vapor to irradiation by light at said first wavelength $\lambda_1$, thereby causing said atoms having said first energy level to be excited to a second higher energy level by absorption of light at a narrow band wavelength centered at $\lambda_1$, said excited atoms then fluorescing at a fluorescence wavelength $\lambda_2$ to a third energy level lower than said second energy level whereby light at said first wavelength $\lambda_1$, passing through said first optical filter is converted to light having said second wavelength $\lambda_2$ passing through said second optical filter; and providing a volume absorbing filter adjacent the light incident side of said first optical filter to attenuate a first set of hyperfine lines with respect to a second adjacent set of hyperfine lines and thereby absorb optical noise.

2. The method of claim 1 including:

providing window means adjacent to said volume absorbing filter, said window means protecting said volume absorbing filter from high pressure.

3. The method of claim 2 wherein:

said window means comprises sapphire.

4. A filter for detecting light at a first wavelength $\lambda_1$ comprising:

an atomic vapor having atoms at a first energy level, said atoms being capable of absorbing light at said first wavelength $\lambda_1$, and, having absorbed said light at said first wavelength $\lambda_1$, fluorescing light at a second wavelength $\lambda_2$;

a first optical filter chosen to transmit light at said first wavelength $\lambda_1$ and block light at said second wavelength $\lambda_2$, said first optical filter having a light incident side and a cavity side;

a second optical filter spaced apart from said first optical filter and partially defining a cavity therewith for containment of said atomic vapor, wherein the cavity side of the first optical filter faces the second optical filter, said second optical filter being chosen to block said first wavelength $\lambda_1$, and transmit said second wavelength $\lambda_2$ whereby irradiation of said atomic vapor by light having said first wavelength $\lambda_1$ and passing through said first optical filter causes said atoms having said first energy level to be excited to a second higher energy level by absorption of light at a narrow band wavelength centered at $\lambda_1$, said excited atoms then fluorescing to a third energy level lower than said second energy level at a fluorescence wavelength $\lambda_2$ thereby resulting in light at said first wavelength $\lambda_1$ passing through said first optical filter being transformed to light having said second wavelength $\lambda_2$ and passing through said second optical filter; and volume absorbing filter means adjacent the light incident side of said first optical filter to attenuate a first set of hyperfine lines with respect to a second adjacent set of hyperfine lines and thereby absorb optical noise.

5. The filter of claim 4 including:

window means adjacent to said volume absorbing filter, said window means protecting said volume absorbing filter means from high pressure.

6. The filter of claim 5 wherein:

said window means comprises sapphire.

7. In an optical filter-detector comprising a transparent cell having first and second optical filters, one filter being located on each opposed side of the cell, the first optical filter having a light incident side and a cell side wherein the cell side of the first optical filter faces the second optical filter, and an atomic vapor in the cell wherein an incoming light pulse having a wavelength $\lambda_1$ is emitted from the cell as a pulse of light having a wavelength $\lambda_2$, the improvement comprising:

volume absorbing filter means adjacent to said first optical filter to attenuate a first set of hyperfine lines with respect to a second adjacent set of hyperfine lines and thereby absorb optical noise.

8. In an optical filter detector method wherein the detector comprises a transparent cell having first and second optical filters, one filter being located on each opposed side of the cell, the first optical filter having a light incident side and a cell side wherein the cell side of the first optical filter faces the second optical filter, and an atomic vapor in the cell wherein an incoming light pulse having a wavelength $\lambda_1$ is emitted from the cell as a pulse of light having a wavelength $\lambda_2$, the improvement comprising:

providing a volume absorbing filter adjacent said first optical filter to attenuate a first set of hyperfine lines with respect to a second adjacent set of hyperfine lines and thereby absorb optical noise.

9. The method of claim 1 wherein:

said atomic vapor comprises cesium vapor.

10. The filter of claim 4 wherein:

said atomic vapor comprises cesium vapor.

11. The filter-detector of claim 7 wherein:

said atomic vapor comprises cesium vapor.

12. The method of claim 8 wherein:

said atomic vapor comprises cesium vapor.

* * * * *